United States Patent [19]

Detig et al.

[11] Patent Number: 5,015,064
[45] Date of Patent: May 14, 1991

[54] ELECTRONIC PRINTER OR SCANNER USING A FIBER OPTIC BUNDLE

[75] Inventors: Robert H. Detig, Berkeley Heights; Michael Sidey, Middletown; Li-Shin Wang, Highland Park, all of N.J.

[73] Assignee: Photon Imaging Corp., Edison, N.J.

[21] Appl. No.: 505,031

[22] Filed: Apr. 5, 1990

[51] Int. Cl.$^5$ .............................................. G02B 6/04
[52] U.S. Cl. ................................ 350/96.24; 350/96.25; 355/1
[58] Field of Search ............... 350/96.24, 96.25, 96.28, 350/6.3, 6.4, 500, 484; 355/1

[56] References Cited

U.S. PATENT DOCUMENTS

| | | | |
|---|---|---|---|
| 4,352,550 | 10/1982 | Uchida | 350/96.25 X |
| 4,409,477 | 10/1983 | Carl | 350/96.24 X |
| 4,674,834 | 6/1987 | Margolin | 350/92.25 |
| 4,760,421 | 7/1988 | Margolin | 355/1 |
| 4,930,849 | 6/1990 | Tanaka | 350/96.24 X |

*Primary Examiner*—John D. Lee
*Assistant Examiner*—Stephen W. Barns
*Attorney, Agent, or Firm*—Herbert Shapiro

[57] ABSTRACT

An electronic printer employing a bundle of optical fibers organizes the fiber ends in first and second faces of the bundle in a linear array and in an annulus or ring array respectively. A spinning prism is operative to image a linear array of light sources onto a segment of the annulus and move the image through a succession of positions to cover the entire area of the annulus in one revolution providing the pixels for a linear segment of a photosensitive medium optically coupled to the first face of the bundle.

13 Claims, 3 Drawing Sheets

ELECTRONIC PRINTER OR SCANNER USING A FIBER OPTIC BUNDLE

FIELD OF THE INVENTION

This invention relates to a printer or scanner and more particularly to an electronic printer or scanner which employs a fiber optic bundle which has the fiber ends at a first face of the bundle organized in a linear array and the ends of the fibers in a second face organized in an area array.

BACKGROUND OF THE INVENTION

U.S. Pat. Nos. 4,674,834 and 4,760,421 issued June 23, 1987 and July 26, 1988 to George D. Margolin describe electronic printers using an array of optical fibers which has a linear first face and an area second face. A cathode ray tube (CRT) is coupled optically to the area face and, for a printer, the linear face is coupled to a light responsive medium such as a xerographic belt.

There is no predetermining relationship between the ends of the fibers in the first face and the opposite ends of those fibers in the second face. Thus, the fiber bundle is not necessarily coherent. The relationship between the ends of the fibers in the two faces is determined during an initialization procedure, specifically, the procedure determines the address of light spots in the CRT face plate and corresponding positions of light (pixels) exiting the fiber ends in the first face of the bundle. The addresses are arranged in a sequence and interrogated in sequence for each of a succession of linear segments of the belt, the pixels being operative to discharge a linear segment of the belt selectively.

The selective discharge of each of the consecutive linear segments corresponding to a page to be printed results in forming on the belt on image corresponding to data stored in a computer memory. The data representing that image controls the presence and absence of light at each address of sequence. Thus, the data and the sequence of addresses determine the organization of the pixels in the linear first face of the bundle to faithfully reproduce the stored image. The electrostatic medium is part of a xerographic module including toner, transfer, and heating stations operative to form an image on plain paper.

Copending applications Ser. No. 468,833 filed Jan. 22, 1990 for Eugene I. Gordon (U.S. Pat. No. 4,975,729) and copending application Ser. No. 467,863 filed Jan. 22, 1990 also filed for Eugene I. Gordon, both assigned to the assignee of the present application, disclose scanner and printers which employ a fiber optic bundle as well as a linear array of light sources and a matrix array of light sources, respectively. These inventions are based on the recognition that the pixels originating at the sequence of addresses of the CRT faceplate determined during the initialization procedure need not be generated in sequence. Instead, those pixels can be generated in sets or all at once as disclosed in the above-noted patent applications respectively.

BRIEF DESCRIPTION OF ILLUSTRATIVE EMBODIMENTS OF THIS INVENTION

The present invention also is partially based on the recognition that pixels for a printer or scanner, using a fiber optic bundle, can be generated in sets rather than sequentially as is necessary with a CRT light generating system. The present invention is also based on the recognition that fiber optic bundles are made more easily in certain geometries and that pixels can be generated in sets or even individually in sequence in a simple manner particularly compatible with some of those geometries.

Specifically, it has been realized that area faces of fiber optic bundles are most easily made round and that that face also can be made most easily in, for example, on annular or ring geometry. In addition, it has been realized that a linear array of light sources can be imaged along, for example, a radially-aligned axis across the fibers. That image of the light sources can be made to move about the annular face of the bundle in a manner to generate the intensity and address for all the pixels at the linear face of the array in consecutive sets which in aggregate define on the electrostatic belt the entire (discharge) pattern for an entire page to be printed.

The image of more than one linear array of light sources may be formed on the annular face simultaneously. If two images are so formed they conveniently are imaged onto linear segments of the annulus 180° apart. If images of four arrays are formed, they are 90° apart. Each linear array of light sources may provide simultaneously, the pixels from different subsets of the address sequence being determined during the initialization period.

The image of a linear array of light sources can be formed on the annulus, as required, by a lens and a prism. The prism is rotated by, for example, a mechanical drive arrangement or by, in effect, adapting the prism to rotate like the rotor of a motor. Also, the linear array can be defined in a matrix array of light sources and "rotated" electronically. In any case, the image is formed across the annulus generally along a radial axis and moved in a manner to maintain alignment with a succession of radial axes as it moves about the annulus.

DETAILED DESCRIPTION OF ILLUSTRATIVE EMBODIMENTS OF THE INVENTION

Figure 1:
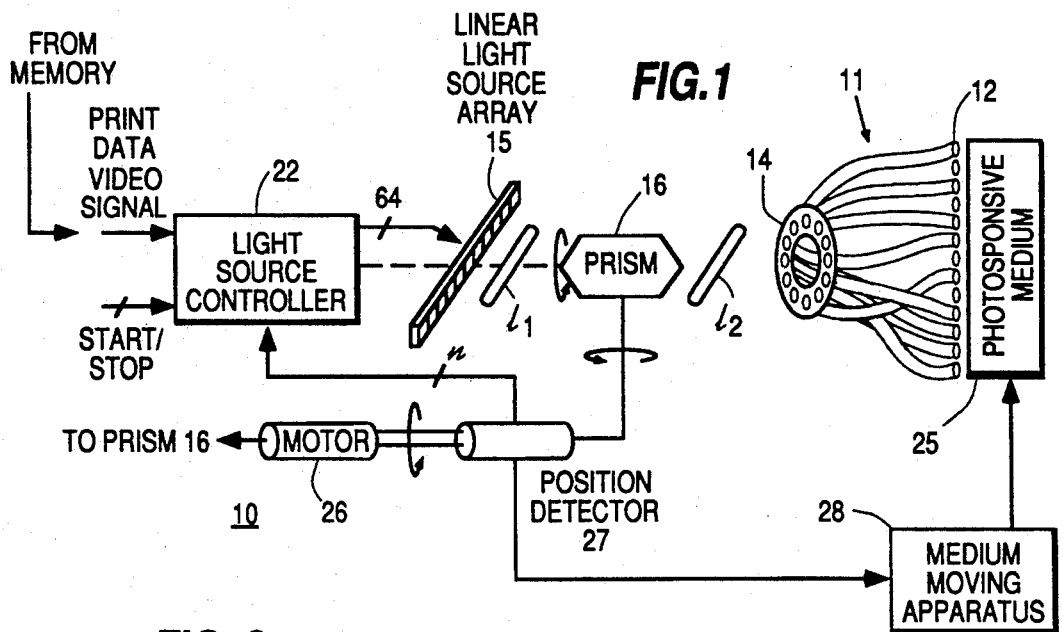
FIG. 1 is a block diagram of an optical subsystem useful for a printer in accordance with the principles of this invention.

FIG. 1 shows an optical subsystem 10 in accordance with the principle of this invention. The subsystem includes a fiber optic bundle 11 having the fiber ends at a first face of the bundle organized along a line 12. The fiber ends at the opposite end of the bundle are organized in a ring or annulus in an area or second face 14.

Figure 2:
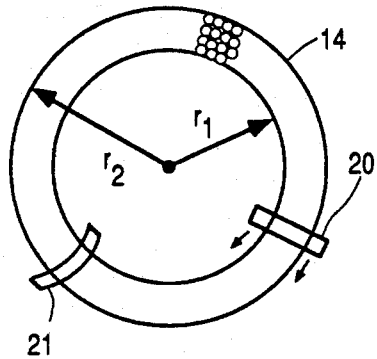
FIG. 2 is a schematic diagram of the area face of the fiber optic bundle of the subsystem of FIG. 1.

The subsystem also includes a linear array of light sources 15. A lens system (two lens $l_1$, and $l_2$ typically) images the array of light sources through a prism 16 onto the annular face. Prism 16 bends the collimated light through it to cause the image of the light source array to "rotate" through a sequence of rectilinear segments of the annulus. FIG. 2 shows the annular area face 14 of the fiber optic bundle with the images of linear and rectilinear segments, corresponding to the array of light sources, designated 20 and 21 respectively.

Light source controller 22, of FIG. 1, is operative to control the on-off states of the light sources of array 15. Specifically, print video data signals are applied to an input to controller 22. Start-stop signals are applied to a second input to controller 22. The output of controller 22 is connected to input to array 15. Thus, data representative of stored images in memory are determinative of the states of the light sources in array 15 during "on" periods corresponding to ones of consecutive linear (or rectilinear) segments (20) of the annulus.

For a printer implementation, the linear face 12 of the fiber optic bundle is imaged onto a linear segment of, for example, an electrostatic belt represented by block 25 designated "photoresponsive medium" in the figure. In order to selectively discharge a linear segment of an electrostatic belt, properly, all the pixels in face 12 have to be present. In order for all those pixels to be present, linear image 20 has to be moved through a succession of positions about annulus 14 and controller 22 operates on array 15 to provide the subset of on-off states (video data) for each such linear segment position. Only when the succession of linear segments corresponds to the entire area of the annulus is the complete set of pixels present at linear end 12 to selectively discharge a single linear segment of the electrostatic belt.

In order to print an image of an entire document, thousands of consecutive linear segments of the electrostatic belt are selectively discharged as described. That means, that prism 16 has to spin thousands of times to move linear (image) 20 completely about annulus 14 thousands of complete rotations. Controller 22, in turn is operative to supply the on-off data for the image 20 in each position of each revolution. It is helpful to understand that a complete revolution of image 20 about annulus 14 is necessary for providing all the pixel data for a single linear scan segment of the electrostatic belt. The movement of the images is produced by rotating prism 16.

Prism 16 is rotated conveniently by a straightforward gear arrangement (not shown) driven by motor 26. The position of the motor and the prism are monitored by position detector 27 and an output from detector 27 is applied to controller 22 to synchronize the motor, the prism, and the supply on-off data for each image 20.

The photoresponsive medium (electrostatic belt) 25 also is moved from one linear segment to the next after each complete revolution of the image of the light source array about the annulus in completed. Such a belt is moved by well known means represented by block 28 of FIG. 1. The movement of belt (25) is synchronized by outputs from position detector 27 and may include a counter (not shown) to count the number of image positions to constitute a complete revolution of the annulus.

There are alternatives to the rotation of the prism described above. The prism, for example, may be adapted as a rotor in a motor. Alternatively, the light sources may be moved or a linear array of light sources may be defined in a matrix of, for example, liquid crystal shutters (LCS) for selectively shuttering back plane illumination. The "linear array" can then be defined in the matrix and moved electronically in response to data stored in a bit map.

In embodiments of this invention where a plurality of light sources are used, the light sources are turned on momentarily as the image of the source passes across the core of each fiber. The number of print events for each source is greater proportionally to the distance of the source from the center of the annulus. The reason for this is that the number of fibers increases with the 1st power of the radius.

If the ratio of the width, w, of a light source to the spacing, s, from the center of the light source to the center of the annulus is approximately:

$$\frac{w}{s} = \sqrt{\frac{r_2}{r_1}} \quad (1)$$

then the light sources can all be identical in size and placed along a curved line, the equation of which is such that it is perpendicular to the circle of radius v, and crosses the circle of radius $r_2$ at an angle.

$$\sin^{-1}\left(\frac{r_1}{r_2}\right)^2 \quad (2)$$

Figure 3:
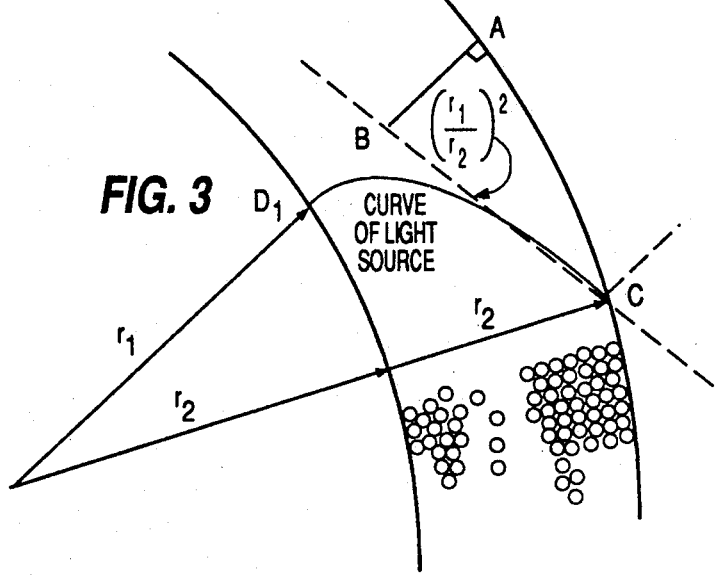
FIG. 3 is an enlarged schematic view of a portion of the area face of FIG. 2.

This is represented in FIG. 3 as curve C-D. Essentially equal duty cycles of "on" time can be achieved by using straight line approximations of curve C-D. For triangle ABC in FIG. 3, the length BC is $$\left(\frac{r_2}{r_1}\right)^2$$

while the length AB=1. Angle ABC is $$\sin^{-1}\left(\frac{r_1}{r_2}\right)^2 \quad (3)$$

the same as equation (2). Therefore, the number of light sources along $r_2$ proportional to the square of the ratio $$\frac{r_1}{r_2}$$

It is assumed that the fibers are packed to an approximately equal density per unit area.

Circuitry for controlling a linear (or curvilinear) array of light sources rotating with respect to an array of fibers in described in connection with FIGS. 1 and 4. The individual sources of light in array 15 of FIG. 1 are small and they are placed relatively close together so that one or more sources (or the images of one or more) correspond to a fiber end. There is one fiber for each pixel of the printed (or scanned) line of the medium. The number of radially-located light sources is chosen such that at least one source will be aligned well enough with each fiber at some point in a complete revolution of the image of the light source array about the annulus. A complete revolution is divided into a sequence of segments (linear or curvilinear) which conveniently is a whole number greater or equal to the number of fibers located along the outer circumference of the annulus. Typically, the number of segments is greater than the number of fibers along the outer periphery to provide some degree of redundancy.

An optical fiber has a core and a cladding and is operative to transmit light through the core so the light source is positioned to direct light at the core. Thus, the number of light source addresses (positions) equals the number of clock positions times the number of light sources per subgroup of light sources for each fiber. Studies have indicated that a subgroup of four (2×2) light sources can be used each of a size $$\frac{1}{\sqrt{2}}\left(\frac{D}{2}\right) \quad (4)$$

where D equals the diameter of the fiber, to compensate for any potential misalignment of light sources and fibers.

If we consider an example where there is an 80% packing of fibers into the area of the annulus, a core to fiber diameter ratio of $$\frac{62}{86}$$

and four light sources per fiber, the number of light source addresses for the entire annulus is 9.64 times the number of fibers. An eight and one half inch wide document at 600 dots per inch (dpi) requires 5100 fibers. Allowing 20% for error and overlap thus requires 59,000 addresses. Each light source is on for 0.077 of the time.

The pixel video data, for example, in a printer arrives line by line each having 5100 pixels. The pixels are supplied in consecutive order. The array of light sources is considered stationary in this example, one (or more than one) prism being operative to move the image of the light source array about an annulus. The prism is a dove prism in this example, and has the property that the image moves twice around the annulus for each rotation of the prism with a slight displacement so that all odd rotations match and all even rotations match. Two sets of data relating light source addresses to pixel position are provided by the initialization procedure in this instance.

We will assume an array of 64 light sources arranged linearly. If we consider a printer printing two pages per minute at 600 dots per inch and 1024 lines per eleven inch page, we get 0.89126 microseconds per pixel.

For 4 pages per minute (PPM) we require 0.44563 microseconds per pixel or 2.24 megahertz; for 6 ppm we need 1.2971 microseconds per pixel or 2.986 megahertz. For eight ppm we need 0.2228 microseconds/pixel or 4.48 megahertz.

In embodiments where the array of light sources is rotating, a single data and power path can be used with the video data processed on the circuit board carrying the light source array and then applied to the position vs light source address look up table. In such an arrangement, a line memory 40 and a position detector 41 along with a look up table 42 are located on a single circuit board with light source array 44 and associated series to parallel shift register 45. A video controller 47 is separate. Video data input to controller 47 is organized into the proper format (5100 data points) and sent to look up table 42. Outputs from position detector 41 are connected to the video controller and to line memory 40 as well as to shift register 45 to synchronize the operation. For position N, controller 47 provides the corresponding 5100 data points to look up table 42; look up table 42 determines the line in line memory 40, corresponding to position N, and applies it to shift register 45. Shift register 45 activates the corresponding sources of array 44.

Components 40, 41, 42, 44 and 45 are all on one board which is shown encompassed by broken circle 49 designated "print head" in the figure. Power is supplied to the print head over a path including coils 50.

Figure 4:
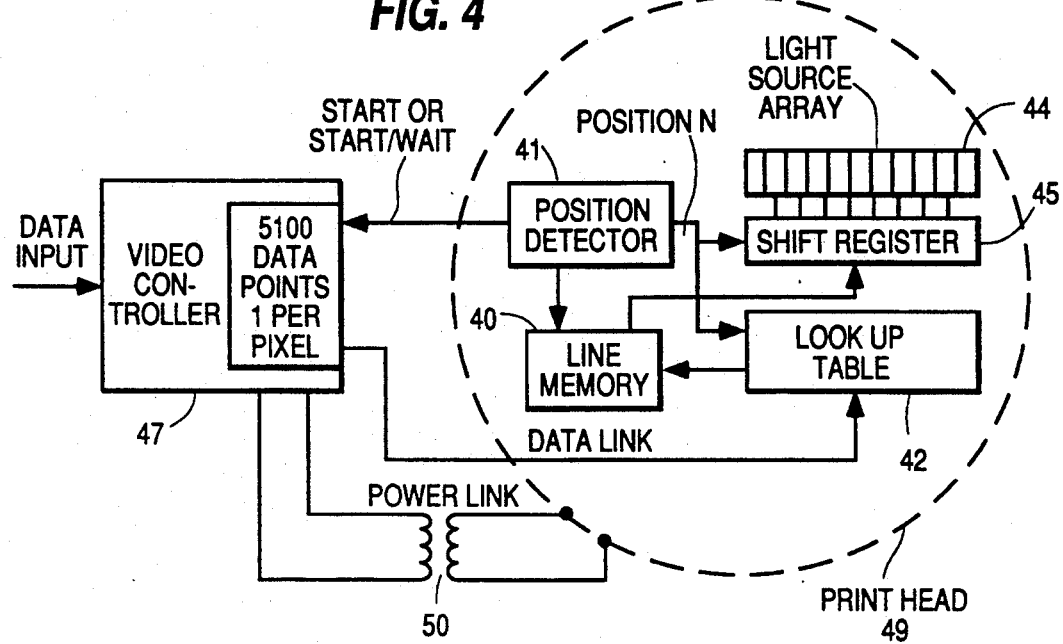
FIG. 4 is a schematic block diagram of an alternative video data path operative in cooperation with the subassembly of FIG. 1 for implementing a printer in accordance with the principles of this invention.

The arrangement of FIG. 4 is similar to that of FIG. 1 except that the fiber optic bundle, the prism, the electrostatic medium, and the prism and belt movers of FIG. 1 are not shown in FIG. 4. In FIG. 1, components corresponding to components 40, 42 and 45 of FIG. 4 are included in controller 22.

In the arrangement of FIG. 4, the data link can send video print data to the print head and can receive synchronization and status information from the print head. The head, including the array of light sources, can be in motion or stationary depending on the design.

The mechanism of the data link can be a conventional slip ring or a segment commutator (with poor wear characteristics). The mechanism also could be a non-contacting medium such as a radio frequency link, capacitive link, rotary transformer (parallel: primary and secondary coil windings), rotary transformer (multiple - non parallel coil) or an optical link such as light emitting diode (LED) - photodetector arrangement or even an ultrasonic link.

Power and data could be sent over the same link in the arrangement of FIG. 4 by, for example, using a coded data stream (such as a preambled Manchester code) sent at a sufficiently high power so that it can be rectified and converted into DC for the logic and light sources with a small position of the signal recovered for data information.

Figure 5:
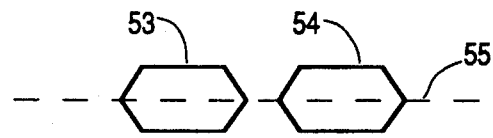
FIG. 5 is a schematic diagram of a multiple prism arrangement useful in a subsystem of the type shown in FIG. 1.

The embodiment of FIG. 1 employs a prism to rotate the image of the light source array. FIG. 5 shows two prisms 53 and 54 aligned along an axis 55. The two prisms can be rotated by motor 26 of FIG. 1 and are operative to move the image around the annulus more quickly. A dove, double dove, reversion, or pechan prism as well as "k" mirrors (Abbe or folded Abbe type rotators) can be used.

Figure 7:
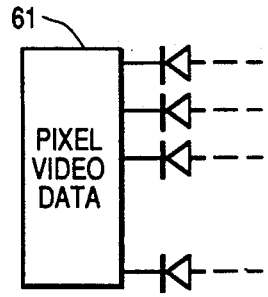
FIG. 7 is a schematic representation of a light-emitting diode organization useful in the subsystem of FIG. 6.
Figure 6:
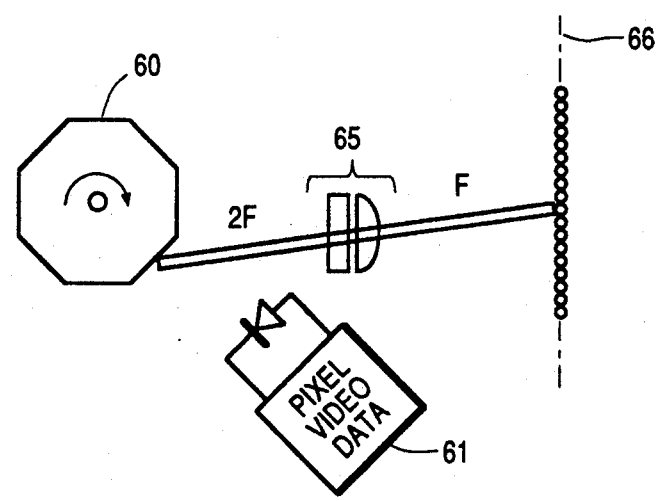
FIG. 6 is schematic representation of an alternative optical subsystem useful for a printer or scanner in accordance with the principles of this invention.

FIG. 6 shows an arrangement employing an octagonal mirror 60. A diode (LED), controlled by video data from source 61, directs light at the mirror. Reflected light from mirror 60 is directed at fiber ends in the annulus via a lens system 65. The fiber ends are indicated by a line of circles arranged along broken line 66. In practice, a plurality of diodes is activated by source 61 as shown in FIG. 7 so pixels are provided at all the fiber ends in a line across the annulus. The fibers along line 66 in FIG. 6 may be taken to represent that line across the annulus in a representative position on the annulus.

Figure 8:
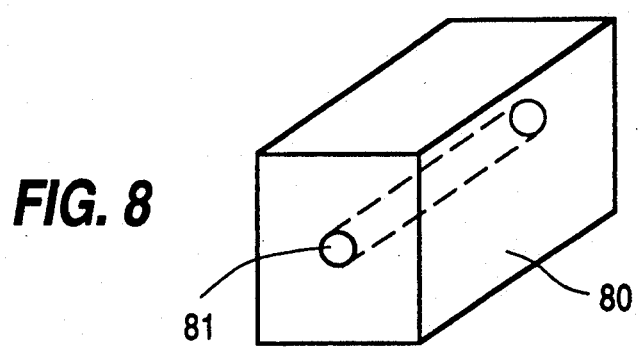
FIGS. 8 through 11 are schematic views of a jig for forming a fiber bundle of the type shown in FIG. 2.
Figure 9:
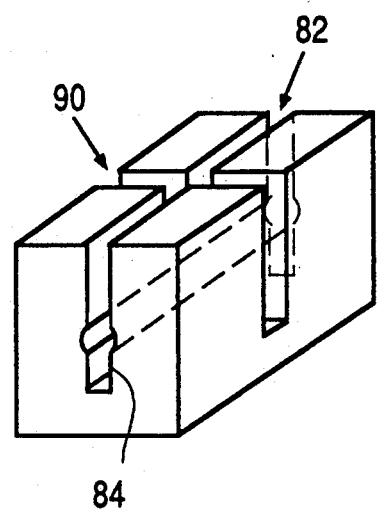

A fiber optic bundle which is linear at one end and in an annulus or ring geometry at the other is formed as follows: The first step is to bore a hole of diameter $2r_2$ in a block having a hardness about the same as that of glass fibers. The next step is to cut a slot into the block. The slot extends through the hole, dividing the block into two like portions connected by a base portion. FIG. 8 shows the block 80 with a hole 81 bored through it. FIG. 9 shows a slot 82 which divides the block.

Figure 10:
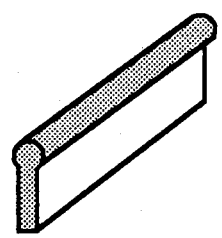

FIG. 10 shows a transparent "key" which sets snugly into portion 84 of the slot defined below the hole 81 as viewed.

Figure 11:
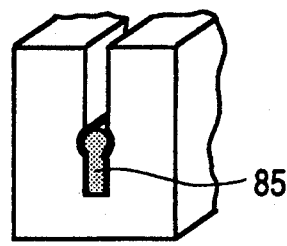

FIG. 11 shows the "key" 85. FIG. 12 shows the key in portion 84. When fibers are drawn, they are collected around a drum in sequence. Before the fibers are cut in lengths, they are captured by an adhesive tape which preserves their order. The so-captured ends are placed to either side of the slot. The fibers will fall into an annular geometry as dictated by the resulting block geometry as shown in FIG. 10. A second slot 90, shown in FIG. 9 is provided as a guide for a cutting edge to cut the fiber bundle in half. Two fiber bundles are thus formed, each having the fibers arranged in a linear array at one face and in an annular array at the other.

A fiber optic bundle of the geometry described is subjected to an initialization procedure to determine the relationship of the addresses of light sources at the area face of the bundle and the pixel positions in the linear face. Such an initialization procedure is carried out by turning on all of the light sources (i.e. LED's) of array 15 of FIG. 1 and moving the array about the annulus of FIG. 2. An array of light sensors (i.e. ccd's), positioned to receive light at linear face 12 of FIG. 1, measures the brightness of the light. Data representative of brightness values are stored in memory providing a profile for each segment of the annulus and determining the position of each fiber. The relationship between the LED addresses and the fiber positions (pixel) in the linear face of the bundle is determined by a succession of sweeps of the LED array about the annulus with patterns of the LED's turned off in a well known binary pattern sequence. This procedure is carried out twice for embodiments where odd and even rotations of a prism are different.

What is claimed is:

1. Apparatus including a plurality of optical fibers; said fibers; having first and second ends thereof organized in a linear array and in an annulus or ring array several fibers deep; in first and second faces respectively, means for selectively generating a pattern of light and means for moving an image of said pattern of light through a succession of positions on said annulus constituting a complete revolution thereabout, and wherein said plurality of fibers comprises a bundle of optical fibers and said means for selectively generating said pattern of light comprises a linear array of light sources and video signal means for controlling the on-off states of said sources for each of said positions.

2. Apparatus as set forth in claim 1 also comprising start-stop means for synchronizing said video signals with each of said succession of positions.

3. Apparatus as set forth in claim 1 also including photoresponsive means optically coupled to said first end for forming an image of said light sources for each of said revolutions.

4. Apparatus as set forth in claim 3 wherein said photoresponsive means comprises an electrostatic medium and said image of said light sources is operative to selectively discharge said medium.

5. Apparatus as set forth in claim 4 wherein said annulus has an inside diameter $r_1$ and an outside diameter $r_2$ and said means for selectively generating light which has a plurality of light sources where the number of said sources increases proportionally with distance from the center of said annulus.

6. Apparatus as set forth in claim 5 wherein the ratio of the width w of one of said light sources and the spacing s from the center of said light source and the center of said annulus is approximately $$\frac{w}{s} = \sqrt{\frac{r_1}{r_2}}$$

where $r_1$ and $r_2$ are the inside and outside diameters of said annulus respectively and said sources are identical in size and located along a curved line the equation of which is such that the line is perpendicular to a circle of radius $r_1$ and crosses the circle or radius $r_2$ at an angle.

$$\sin^{-1}\left(\frac{r_1}{r_2}\right)^2$$

7. Apparatus as set forth in claim 6 wherein said curved line is approximated by straight line segments and the number of light sources there along is proportional to $$\sin^{-1}\left(\frac{r_1}{r_2}\right)^2$$

8. Apparatus as set forth in claim 1 wherein said means for moving comprises a prism and means for rotating said prism.

9. Apparatus as set forth in claim 8 also including means for providing a stream of video data for said means for generating light and means for synchronizing said data with the rotation of said prism.

10. Apparatus as set forth in claim 1 wherein said means for moving comprises a mirror and means for moving said mirror.

11. Apparatus comprising a fiber optic bundle, said bundle having first ends of the fibers therein arranged linearly in a first face, said bundle having the opposite ends of said fibers arranged as an annulus several fibers deep; in a second face, means for projecting an image of an array of light sources on correspondingly-shaped segments of said 2nd, face, means for moving said image through a sequence of said segments covering the entire area of said second face, means for changing the light pattern by switching from said array of light sources for each of said segments and means for synchronizing the means for moving and the means for changing in a manner to organize pixels in said linear face for faithfully reproducing said image of said array of light sources at said first face, said array of light sources having a generally linear geometry for defining a generally linear segments in said annulus.

12. Apparatus as set forth in claim 11 wherein said means for moving comprises a prism and means for rotating said prism in a manner to move said light pattern.

13. Apparatus as set forth in claim 12 wherein said means for projecting also includes memory means for applying to said linear array data representative of the on-off states of individual cells of said array.

* * * * *